United States Patent Office 3,639,484
Patented Feb. 1, 1972

3,639,484
PREPARATION OF 1-THIOALDITOLS, 1-THIO-ALDITOL DISULFIDES AND RELATED HYDROXY THIOLS
Alan R. Procter, North Vancouver, British Columbia, Canada, assignor to MacMillan Bloedel Limited, Vancouver, British Columbia, Canada
No Drawing. Filed July 15, 1968, Ser. No. 744,648
Int. Cl. C07c *149/06, 149/12*
U.S. Cl. 260—608                    6 Claims

ABSTRACT OF THE DISCLOSURE

The invention is concerned with the preparation of 1-thioalditols, 1-thioalditol disulfides and related hydroxy thiols by treating solutions of sugar aldoses or ketoses with hydrogen sulfide in the presence or absence of various bases or basic salts.

BACKGROUND OF THE INVENTION

This invention relates to the preparation of 1-thioalditols and disulfides thereof and related hydroxy thiols.

1-thioalditol disulfides are readily converted to the corresponding free thiols via catalytic hydrogenation or by using a reducing agent, such as zinc at low pH, zinc amalgam, aluminium amalgam, sodium borohydride, or zinc dithionite.

1-thiosorbitol is typical of a 1-thioalditol and is derived from the aldose, glucose. 1-thiosorbitol and white crystalline solid, melting at 93° C. and is very soluble in water, less so in alcohol. It has the characteristic chemical properties of polyhydric alcohols and of thiols. In alkaline solution it reacts with an alkyl halide to form a sulfide. Like other thiols, it forms salts with heavy-metal ions such as $Cu^{++}$, $Cu^+$, $Fe^{++}$, $Hg^+$, $Pb^{++}$, $Sn^{++}$, $Ni^{++}$ and $Zn^{++}$, to give mercaptides which are unexpectedly soluble in water. 1-thiosorbitol dissolves silver chloride with the liberation of hydrochloric acid.

Although a little known compound and one which has been difficult to obtain, 1-thiosorbitol has attracted considerable attention. It has found applications in the pharmaceutical and immunological fields. 1-thiosorbitol has found uses as an activator and stabilizer in polymerization processes, and has been used to improve the oil resistance of rubbers, and the enamelling of baths, as well as being used as a corrosion inhibitor and surface active cleansing agent. 1-thiosorbitol has also found uses as an intermediate in the preparation of insecticides, rubber chemicals and dyes, as well as a stabilizer of various compounds to light, radiation, heat and metal contaminants. 1-thiosorbitol has found uses as a colour stabilizer and a polymer modifier in textiles, and has been claimed to aid the separation of metal from ores. As typical hydroxy thiol, 1-thiosorbitol has similar properties and applications as other more readily available but expensive hydroxy thiols, such as 1-thioglycerol.

1-thioalditol disulfides are the simple oxidation products of 1-thioalditols and find use in polymerization processes, as accelerators for vulcanization, antioxidants or stabilizers for synthetic rubber latexes and coagulated polymers, and as softening agents for reclaimed vulcanizates. Other useful applications of disulfides are as additives to fuel and lubricating oils, and in the fields of hair waving compounds, enzyme inhibitors, pesticides and chemotherapeutics.

It is known to prepare thiols of the type aforementioned by reductive thiolation of the appropriate aldehydes. This method involves treating the starting material, for example glucose, with hydrogen at 1000–2000 p.s.i.g. and sulfur in the presence of relatively large amounts, e.g. about 10% of a sulfactive catalyst, for example cobalt polysulfide. The resultant 1-thiosorbitol is isolated by crystallization from ethanol in about 27% yield, after prior isolation as a metal salt or disulfide derivative. This method has the inherent disadvantages of the very high pressures involved, as well as the expensive and unstable nature of the catalyst used. Moreover, the catalyst preparation is fairly complex and must be carried out immediately before use.

SUMMARY OF THE INVENTION

The object of the present invention is to provide a method of preparing 1-thioalditols, 1-thioalditol disulfides and related hydroxy thiols which does not suffer from the disadvantages of the method described above, and which is generally simpler and more economical and efficient.

According to the present invention there is provided a method of preparing thiols of the type aforementioned and disulfides thereof which comprises treating an aqueous solution of an aldose or a ketose with gaseous hydrogen sulfide, at relatively lower pressure. The term aldose, includes various monosaccharide compounds with a potential reducing aldehyde function, as well as disaccharides containing an aldehyde function such as maltose. Non-reducing carbohydrate compounds containing a potential carbonyl function of which fructose and sucrose are typical, are termed ketoses. These latter compounds also yield hydroxy thiols using the preparation methods herein described. In either case, the thiol group is linked to the carbon atom originally forming the potential aldehyde or carbonyl function.

The partial pressure of the hydrogen sulfide is preferably in the region of 100 p.s.i. or higher, but pressures as low as 10 p.s.i. may be used. Also, the aldose [or ketose] may be used as an aqueous solution in a weakly basic medium provided, for instance, by bases and basic salts of alkali metals, alkaline earth metals or ammonia. The preferred temperature for the reaction lies in the range of from 50° to 150° C.

The reaction time is dependent upon the conditions and reagents chosen. Generally, a longer time is required if the aldose is not in a basic solution, and in such a case a somewhat higher pressure is preferred for optimum yield. However, in using the aldose in this way a purer product is usually obtained and less hydrogen sulfide is required for the reaction. A cleaner and more manageable reaction solution is also formed.

1-thioalditols and 1-thioalditol disulfides are also produced when the aldose is dissolved in dilute sulfuric acid, and treated with hydrogen sulfide gas. However, with these methods somewhat lower product yields are obtained.

An advantage of this invention is that unconsumed hydrogen sulfide may be easily recovered from the reaction vessel by venting, and from the reaction mixture by aspiration, and recompressed for re-use.

Another advantage of this invention is that unreacted starting materials may be reused after the products have been removed and make-up chemicals have been added. Elemental sulfur, which is generally produced in the reaction, may be recovered from the reaction mixture by centrifugation or filtration or settling.

The products may be isolated in crystalline form though it is generally more convenient that they be isolated as syrups or concentrated aqueous or alcoholic solutions. The products, 1-thioalditol and 1-thioalditol disulfide, may be isolated separately from the same reaction mixture, by procedures which are apparent in the examples given below. Alternatively, the products may be totally isolated as 1-thioalditol by prior reduction of the reaction mixture with such reducing agents as are mentioned above.

The reaction products may be totally isolated as 1-thioalditol disulfide by prior oxidation of the reaction mixture with oxidizing agents, such as air, oxygen peroxide, polysulfide. Other hydroxy thiol products are isolated using similar procedures.

It will be apparent that 1-thioalditols and 1-thioalditol disulfides can be produced when the aldose starting material constitutes the reducing end unit of a higher molecular weight carbohydrate. In such cases though, the product yields are low due to the relatively low proportion of aldose. Higher yields of 1-thioalditol and 1-thioalditol disulfide may be obtained from such high molecular weight carbohydrates, if a hydrolytic degration step is included in the prescribed preparation method. This may be achieved with specific enzymes, or carrying out the reaction at low pH.

DESCRIPTION OF THE PREFERRED EMBODIMENTS

The invention is illustrated by the following examples.

Example I 120 gms. of glucose is dissolved in 640 gms. of water containing 3 gms. of sodium carbonate. This solution is charged to a pressure reaction vessel and the air purged from the vessel with nitrogen. Hydrogen sulfide gas is added until a pressure of about 100 p.s.i.g. is reached. The temperature of the reaction vessel is raised. As hydrogen sulfide is consumed at higher temperatures, more of the gas is added to maintain a pressure of about 160 p.s.i.g. The reaction temperature and pressure are maintained at about 125° C. and about 160 p.s.i.g. for 50 minutes. The total reaction time is 150 minutes. After cooling, the hydrogen sulfide is vented into a gas accumulator for reuse and the reaction vessel purged with nitrogen.

The reaction mixture may be analyzed for thiol and disulfide products after removal of inorganic anions with an anion exchange column in its acetate form. The thiol is determined by titrating aliquots of the reaction mixture against standard iodine. The total disulfide and thiol content is determined similarly by iodine titration after prior reduction of the disulfide to free thiol with zinc dust in acetic acid.

The products, 1-thiosorbitol disulfide and 1-thiosorbitol, may be isolated separately in crystalline form using the following procedure: The reaction mixture is filtered and the filtrate concentrated under reduced pressure to about 300 mls., thus removing dissolved gases. 20 gms. of cuprous oxide is added to the solution with vigorous stirring at 55° C. After 15 minutes the suspension is poured into 3 litres of methanol. Inorganic material and the copper salt of 1-thiosorbitol is removed by filtration, and washed with more methanol. The filtrate is concentrated under reduced pressure to a syrup and the crude 1-thiosorbitol disulfide recrystallized from about 4 litres of hot absolute methanol. Pure 1-thiosorbitol disulfide, M.P. 129–130° C., may be obtained by recrystallization from ethanol.

The crude copper salt of 1-thiosorbitol is suspended in 90% ethanol and treated with hydrogen sulfide at about 150 p.s.i.g. for about 10 minutes. The mixture is filtered, and the filtrate solvent exchanged to absolute alcohol. The 1-thiosorbitol, M.P. 93° C., is obtained by crystallization from cold absolute alcohol.

The yield of 1-thiosorbitol is 14.4 gms. (12%) and of 1-thiosorbitol disulfide 52.1 gms. (44%).

It is sometimes difficult to obtain maximum yields of crystalline 1-thiosorbitol by crystallization from absolute alcohol. An alternative method of product isolation gives better total yields. The 1-thiosorbitol in the crude reaction mixture is oxidized to 1-thiosorbitol disulfide with an oxidizing agent, for example oxygen. The reaction mixture is then concentrated under reduced pressure to a syrup and added to about 4 litres of hot absolute methanol. Insoluble material is filtered off from the methanol slurry and the filtrate is set aside for the 1-thiosorbitol disulfide to separate by crystallization. The product is purified in a similar manner as described above.

EXAMPLE II

A solution of 60 gms. of glucose in 330 mls. of water is charged to a pressure reaction vessel. The vessel is purged with nitrogen, before hydrogen sulfide gas is added to a pressure of about 70 p.s.i.g. The vessel is heated up to a temperature of 150° C. Consumption of hydrogen sulfide gas is observed at temperatures above 120° C., and the gas is continuously replenished to a pressure of 170 p.s.i.g. After a total time of 210 minutes the reaction vessel is cooled, the hydrogen sulfide vented into a gas accumulator for re-use and the vessel purged with nitrogen. The time at the reaction temperature of 150° C. is 150 minutes.

Analysis of the reaction mixture shows it to contain 15.3 gms. of 1-thiosorbitol and 14.6 gms. of 1-thiosorbitol disulfide, or a total product yield of 50% based on glucose.

The reaction mixture is filtered and then refluxed for 30 minutes in the presence of 70 gms. of powdered zinc. The reduced solution is filtered free of insoluble material and concentrated under reduced pressure to about 50 mls. volume. This solution is then added with stirring to 3000 mls. of methanol. The white precipitate, containing the zinc salt of 1-thiosorbitol is filtered from the methanol slurry and suspended in 600 mls. of 90% ethanol. This suspension is treated with gaseous hydrogen sulfide at 150 p.s.i., and 50° C. for 10 minutes. The alcoholic slurry is filtered free of insoluble material, mostly zinc sulfide, and the filtrate concentrated and analyzed for 1-thiosorbitol. The recovery of 1-thiosorbitol was 27 gms. Most of the unrecovered product is present in the methanol solution, which may be re-used in further extractions.

Example III

A solution of 60 gms. of glucose in 330 mls. of water containing 0.85 gm. of ammonium hydroxide is charged to a pressure reaction vessel. The vessel is purged with nitrogen and hydrogen sulfide gas is added to a pressure of about 90 p.s.i.g. The vessel is warmed to a temperature of 125° C. During this preiod, the hydrogen sulfide pressure increases to about 140 p.s.i.g. before the gas is rapidly consumed at temperatures above 85° C. No further gas is added to the system, and after a total time of 90 minutes the pressure is down to 50 p.s.i.g. At this time, analysis of a sample of the reaction mixture shows a total product yield of 28.8 gms. or 48% on glucose. After 6 hours, the hydrogen sulfide gas is completely consumed and total product yield of 34.6 gms. or 58% on glusose, is obtainable.

After cooling the pressure vessel, the reaction mixture is filtered and treated with an amount of hydrogen peroxide equivalent to the 1-thiosorbitol content. The reaction mixture is then concentrated under reduced pressure to a syrup and dissolved in 2500 mls. of hot methanol. This methanol solution is then set aside for 1-thiosorbitol disulfide to crystalize out. The amount of 1-thiosorbitol disulfide recovered is 21.2 gms. or 35% yield on glucose. The unrecovered product remains in the methanol solution, which may be re-used in further product isolations.

Example IV

A solution of 74 gms. of sucrose in 400 mls. of water is charged to a pressure reaction vessel. The vessel is purged with nitrogen, and hydrogen sulfide gas is added to a temperature of about 90 p.s.i.g. The vessel is warmed to a temperature of 125° C. The hydrogen pressure at this reaction temperature is 150 p.s.i.g., and is continually added to maintain this pressure. After 80 minutes under these reaction conditions, the pressure vessel is cooled, and the hydrogen sulfide vented to a gas accumulator for re-use.

The reaction product containing mixed hydroxy thiols is isolated as a concentrated alcoholic solution using the same general procedure as is described in Example II.

These hydroxy thiols contain thiol products derived from fructose as well as 1-thiosorbitol and are present in a total yield of 33 gms. or 45% on sucrose. Expressed as equivalents of thiol, the yield is 270 milliequivalents of thiol per 100 gms. of sucrose.

Example V

A solution of maltose is treated in a similar fashion as described in Example IV, except that reaction temperature is 150° C. After five hours, the hydroxy thiol reaction product is isolated in the same manner as is described in Example II. A yield of 330 milliequivalents of thiol per 100 gms. of maltose is obtained.

Example VI

A solution of 25 gms. of fructose in 400 mls. of water is treated with hydrogen sulfide at 150 p.s.i.g. and 130° C. following a similar procedure as described in Example IV. After 3½ hours the hydroxy thiol reaction product is isolated in the same manner as is described in Example II. A yield of 230 milliequivalents of thiol per 100 gms. of fructose is obtained. This corresponds to about a 38% yield on fructose.

What is claimed is:

1. A method for the preparation of thioalditols and thioalditol disulfides which consists essentially of treating an aqueous solution of a sugar aldose or ketose with gaseous hydrogen sulfide at a partial pressure of between 10 and 250 lb./sq. in and a temperature of between 50 and 200° C.

2. A method as claimed in claim 1 wherein the product solution of thioalditols and thioalditol disulfides is reduced with an agent selected from the group consisting of zinc at low pH, zinc amalgam, aluminum amalgam, sodium borohydride, nascent hydrogen, zinc dithionite, prior to isolation of the product as a thioalditol.

3. A method as claimed in claim 1 wherein the product solution of thioalditols and thioalditol disulfides is oxidized with an agent selected from the group consisting of air, oxygen, hydrogen peroxide, polysulfide, prior to isolation of the product as a thioalditol disulfide.

4. A method as claimed in claim 1 wherein the said aldose or ketose is selected from a group consisting of glucose, maltose, lactose, sucrose or fructose.

5. A method as claimed in claim 2 wherein the said aldose or ketose is selected from a group consisting of glucose, maltose, lactose, sucrose or fructose.

6. A method as claimed in claim 3 wherein the said aldose or ketose is selected from a group consisting of glucose, maltose, lactose, sucrose or fructose.

References Cited

UNITED STATES PATENTS 2,402,640  6/1946  Lazier et al. _____ 260—609

HENRY R. JILES, Primary Examiner

C. M. SHURKO, Assistant Examiner

U.S. Cl. X.R.

260—609 A